United States Patent
Jia (10) Patent No.: US 11,208,102 B2
(45) Date of Patent: Dec. 28, 2021

(54) ADAPTIVE CRUISE CONTROL

(71) Applicant: DENSO CORPORATION, Kariya (JP)

(72) Inventor: Yanzhao Jia, Wegberg (DE)

(73) Assignee: DENSO CORPORATION, Kariya (JP)

( * ) Notice: Subject to any disclaimer, the term of this patent is extended or adjusted under 35 U.S.C. 154(b) by 180 days.

(21) Appl. No.: 16/502,506

(22) Filed: Jul. 3, 2019

(65) Prior Publication Data
US 2020/0031349 A1 Jan. 30, 2020

(30) Foreign Application Priority Data

Jul. 24, 2018 (DE) .................. 102018212318.7

(51) Int. Cl.
  *B60W 30/16* (2020.01)
  *B60W 50/10* (2012.01)
  *B60W 50/00* (2006.01)
  *B60W 30/14* (2006.01)

(52) U.S. Cl.
  CPC .......... *B60W 30/16* (2013.01); *B60W 30/146* (2013.01); *B60W 50/0097* (2013.01); *B60W 50/0098* (2013.01); *B60W 50/10* (2013.01); *B60W 2420/42* (2013.01); *B60W 2420/52* (2013.01); *B60W 2520/10* (2013.01); *B60W 2540/215* (2020.02); *B60W 2554/801* (2020.02); *B60W 2720/10* (2013.01)

(58) Field of Classification Search
  CPC .................................................. B60W 30/16
  See application file for complete search history.

(56) References Cited

U.S. PATENT DOCUMENTS

| | | | | |
|---|---|---|---|---|
| 2015/0073663 | A1* | 3/2015 | Nilsson | B60W 50/0098 701/41 |
| 2019/0100209 | A1* | 4/2019 | Plianos | B60W 30/18127 |
| 2019/0329772 | A1* | 10/2019 | Graves | B60W 30/0956 |
| 2019/0391259 | A1* | 12/2019 | Shimizu | G01S 13/931 |

FOREIGN PATENT DOCUMENTS

| | | |
|---|---|---|
| DE | 4209047 C1 | 8/1993 |
| DE | 102012218842 A1 | 4/2014 |
| GB | 2265241 A | 9/1993 |

OTHER PUBLICATIONS

Daliang Shen et al. "Optimising Driving and Powertrain Control in Serial Hybrid Vehicles", ATZ worldwide, pp. 68-71, Nov. 2017.
Xiaohai Lin, et al. "Simplified Energy-Efficient Adaptive Cruise Control based on Model Predictive Control", 20th World Congress, (IFAC) International Federation of Automatic Control Papers Online 50-1 (2017) 4794-4799.

* cited by examiner

*Primary Examiner* — Imran K Mustafa
(74) *Attorney, Agent, or Firm* — Oliff PLC (57) ABSTRACT

A vehicle adaptive cruise control apparatus for controlling traveling of a host vehicle is provided. The vehicle adaptive cruise control apparatus that is configured to: receive a vehicle speed of the host vehicle; receive an inter-vehicle distance between a preceding vehicle and the host vehicle; define a minimum safe inter-vehicle distance; set a reaction time of a driver; and use adaptive cruise control. The vehicle adaptive cruise control apparatus uses a maximum speed reference for the host vehicle which is defined as ratio between a) the inter-vehicle distance and b) the reaction time of the driver.

11 Claims, 5 Drawing Sheets

ADAPTIVE CRUISE CONTROL

CROSS REFERENCE TO RELATED APPLICATION

This application is based on German Patent Application No. 10 2018 212 318.7 filed on Jul. 24, 2018, the disclosure of which is incorporated herein by reference.

TECHNICAL FIELD

The present disclosure relates to the Adaptive Cruise Control (ACC) based on model predictive control (MPC), which is able to lower the real driving emission (RDE).

BACKGROUND

Predictive adaptive cruise control (PACC) has been developed recently and uses future information to reduce the RDE.

SUMMARY

The present disclosure describes an adaptive cruise control apparatus for controlling the traveling of a host vehicle on the basis of a movement of a proceeding vehicle travelling in front of the host vehicle. The adaptive cruise control apparatus is configured to receive a vehicle speed of a host vehicle, receive an inter-vehicle distance between a preceding vehicle and the host vehicle, define a minimum safe inter-vehicle distance, set a reaction time, and use adaptive cruise control.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Predictive adaptive cruise control (PACC) has been developed recently and uses future information to reduce the RDE. A new approach has been proposed how the driving strategy and the powertrain control algorithm can be combined for a serial hybrid vehicle in order to reduce the fuel consumption and increase the driving range. In order to do this, the powertrain control preview information in relation with look-ahead information, such as road signs, traffic density or the geometry and topography of the driven route, is used for predict the driving speed and the future power demand for propulsion. In the model predictive speed and headway control (MPSHC) of a related art, this look-ahead information is used for estimating the constraints for speed optimization. A related art finds a specific solution for lowering the RDE while tracking the proceeding vehicle and keeping a safe distance between the proceeding vehicle and the host vehicle. In the model predictive control (MPC), trade-offs with respect to the above-mentions targets are to be accepted since, for the conflicting targets and for the non-linear control problems, a sufficiently suitable problem formulation could not be found.

An energy-efficient Adaptive Cruise Control based on MPC is proposed in which the goal is to reduce the energy consumption of the host vehicle by using MPC to smoothen the velocity profile such that the acceleration and deceleration are minimized considering available environment information. In this approach, the host vehicle is allowed to move in an inter-vehicle distance corridor bounded by a safe minimal distance and a maximal distance. The result of a related art is a simplified energy-efficient ACC concept which is applicable for conventional vehicles and also for electric vehicles while having a good compromise between energy economy and real-time ability. To ensure a reliable control, limitation in relation to velocity, safety, driving comfort, traction force and braking force are regarded and formulated as linear constraints. However, the results of the control are not yet sufficiently convincing.

The present disclosure provides an Adaptive Cruise Control based on model predictive control which is able to reduce the real driving fuel consumption of the host vehicle, which enables a host vehicle to have an improved ability of tracking the proceeding vehicle and which is configured to enable the host vehicle to strictly keep the minimum safety distance with respect to the proceeding vehicle.

According to one aspect of the present disclosure a vehicle Adapted Cruise Control apparatus for controlling the traveling of a host vehicle on the basis of a movement of a proceeding vehicle travelling in front of the host vehicle is provided. The apparatus may include host vehicle speed input means for receiving the vehicle speed of the host vehicle, inter-vehicle distance input means for receiving an inter-vehicle distance between the preceding vehicles and the host vehicle; safe distance defining means for defining a minimum safe inter-vehicle distance; reaction time setting means for setting a reaction time of the driver with respect to an inter-vehicle comfort distance preferred by the driver; driving cost optimization means which is configured to use adaptive cruise control based on model predictive control in space domain so that the driving costs of the host vehicle are optimized by varying vehicle speed and/or traction force of the host vehicle. The driving cost optimization means uses a maximum speed reference for the host vehicle which is defined as ratio between a) the inter-vehicle distance detected by the inter-vehicle distance sensor reduced by the minimum safe inter-vehicle distance defined by the safe distance defining means and b) the reaction time of the driver set by the reaction time setting means. The maximum speed reference of the present disclosure changes with the current inter-vehicle distance between the host vehicle and the proceeding vehicle. Therefore, the maximum speed reference has a clearer physical meaning. If the inter-vehicle distance between the proceeding vehicle and the host vehicle reduces, the rebound force which the host vehicle receives increases so that the inter-vehicle distance becomes larger. Since the inter-vehicle distance is in the present disclosure in a more reasonable range, the real driving emission is lowered.

According to another aspect of the present disclosure, a method for executing a vehicle adaptive cruise control for controlling the traveling of a host vehicle on the basis of the movement of a preceding vehicle traveling in front of the host vehicle is provided. The method may include steps of receiving the vehicle speed of the host vehicle, receiving an inter-vehicle distance between the preceding vehicles and the host vehicle, defining a minimum safe inter-vehicle distance, setting a reaction time of the driver with respect to an inter-vehicle comfort distance preferred by the driver, optimizing the driving costs using adaptive cruise control based on model predictive control in space domain so that the driving costs of the host vehicle are optimized by varying the inter-vehicle distance. The during optimizing the driving costs a maximum speed reference for the host vehicle is used, which is defined as ratio between a) the inter-vehicle distance reduced by the minimum safe inter-vehicle distance and b) the reaction time of the driver. With this method the real driving emission is lowered as already specified in relation to the first aspect.

In the following, an embodiment specifying a vehicle adaptive cruise control apparatus of the present disclosure is explained with reference to the drawings. The cruise control apparatus according to the present disclosure is able to be mounted on a vehicle, and is configured to execute a vehicle-following control for following a preceding vehicle among the preceding vehicles which are traveling in front of the host vehicle.

Figure 1:
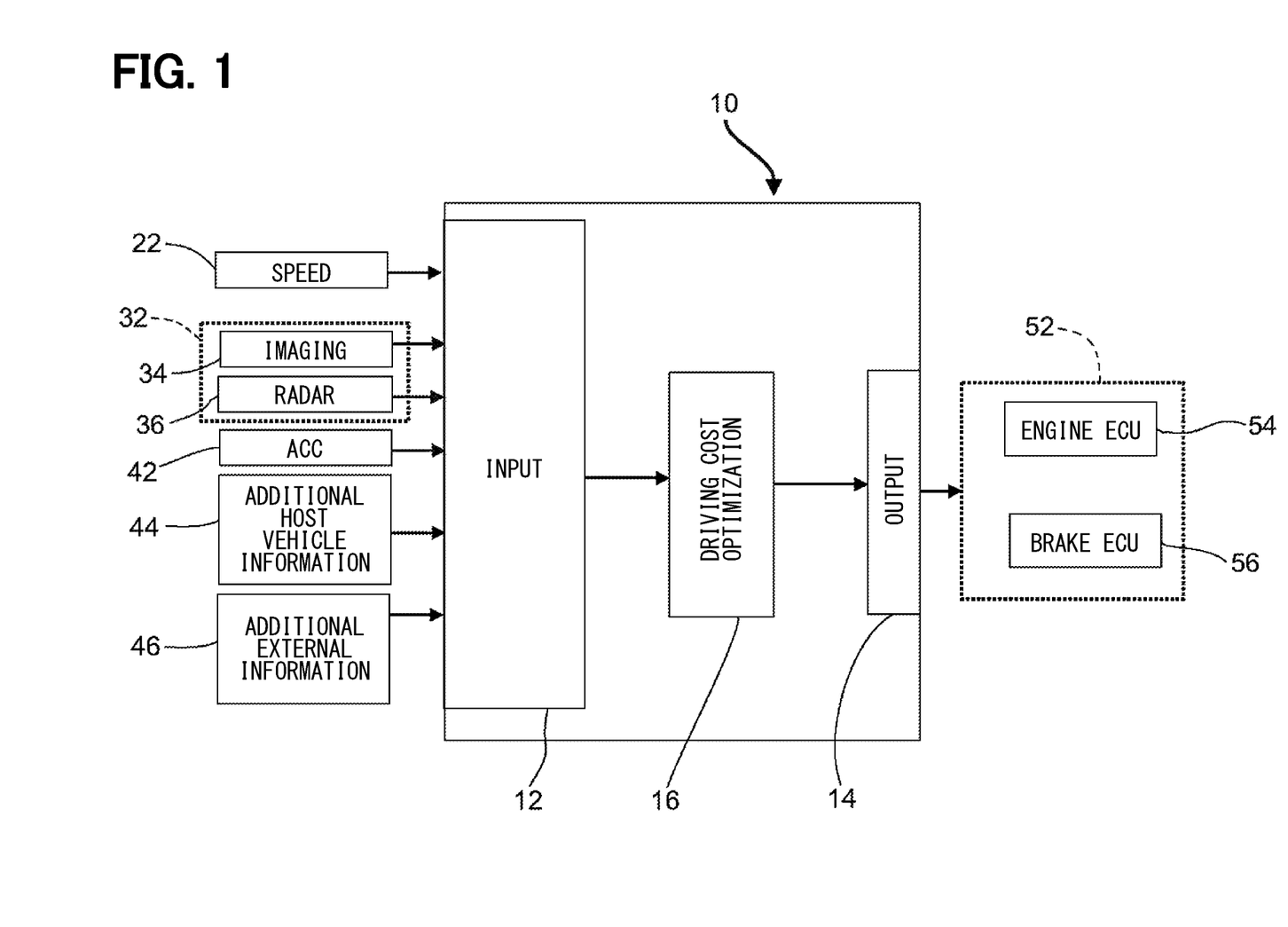
FIG. 1 is a block diagram illustrating a schematic configuration of a vehicle cruise control apparatus according to the present disclosure.

In FIG. 1, the cruise control apparatus 10 is a computer provided with a central processing unit (CPU), a random access memory (RAM), a read-only memory (ROM), an input/output (I/O) and the like. This vehicle cruise control apparatus 10 comprises information input means 12, information output means 14 and driving cost optimization means 16. The driving cost optimization means 16 receive the information from the information input means 12 and sends information to the information output means 14. The information input means 12 may correspond to an information input module. The information output means 14 may correspond to an information output module. The driving cost optimization means 16 may correspond to driving cost optimization module.

The information input means 12 receives from the outside of the vehicle cruise control apparatus 10, multiple external information and multiple host vehicle information. The information input means 12 comprises host vehicle speed input means for receiving the vehicle speed of the host vehicle, inter-vehicle distance input means for receiving an inter-vehicle distance between the preceding vehicles and the host vehicle, safe distance defining means for defining a minimum safe inter-vehicle distance, reaction time setting means for setting a reaction time $h_r$ of the driver with respect to an inter-vehicle comfort distance $d_{comf}$ preferred by the driver, preceding vehicle speed input means for receiving the vehicle speed of the preceding vehicle. The host vehicle speed input means may correspond to a host vehicle speed input module. The inter-vehicle distance input means may correspond to an inter-vehicle distance input module. The safe distance defining means may correspond to a safe distance defining module. The reaction time setting means may correspond to a reaction time setting module. The preceding vehicle speed input means may correspond to a preceding vehicle speed input module. The reaction time input means may be in the information input means 12, and may correspond to a reaction time input module. The safe distance defining means is configured to define a minimum safe inter-vehicle distance $d_{min}$ further details of which are explained below. The reaction time setting means is configured to set the reaction time of the driver. The reaction time $h_r$ preferred by the driver influences the preferred comfort distance $d_{comf}$. An increase of the reaction time $h_r$ means an intention of the driver to increase the inter-vehicle distance. In addition, an increase in the reaction time $h_r$ also means an intention of the driver to reserve increased freedom for the host vehicle H to optimize its speed.

The information output means 14 comprises traction force output means for outputting the traction force of the host vehicle. The traction force output means may correspond to a traction force output module.

As an example for host vehicle information detection and external information detection the results of which are input to the information input means 12, FIG. 1 shows a speed sensor 22, an object detection means 32, an adaptive cruise control switch 42, a detector of additional host vehicle information 44, like for instance the steering angle and the yaw velocity, and a detector of additional external information 46. The present disclosure is not limited to this information as long as external information and host vehicle information are able to be input into the information input means. The object detection means 32 may correspond to an object detection module.

More specifically, in relation to the host vehicle information, the speed sensor 22 detects the host vehicle speed. An example for the object detection means 32 is given with an imaging device 34 and a radar device 36.

The imaging device 34 can be an onboard camera and can be constituted by a charge-coupled device (CCD) camera, a complementary metal-oxide-semiconductor (CMOS), an image sensor, a rear infrared camera, and the like. The imaging device 34 is able to capture an image of the peripheral environment including the travelling road of the host vehicle and is able to produce image data indicating the captured image to be sequentially output to the information input means 12 of the vehicle cruise control apparatus 10. The imaging device 34 can be installed for example in the vicinity of the upper side of a front windshield of the host vehicle and can for instance capture images of a region that spreads over a predetermined angle range towards the forward direction of the vehicle in the center of the imaging axes. The imaging device 34 can be, for example, a monocular camera or a stereo camera. While using a camera, it is possible to recognize a speed sign. The speed limit of the road ahead is one useful input because optimization take future speed limit into account to adjust the speed of the host vehicle within a control horizon.

The radar device 36 is a detection device for detecting objects by transmitting electromagnetic waves as transmission waves (survey wave), and receiving the reflected waves. The radar device 36 can for instance be a millimeter-wave radar and can be attached to the front of the host vehicle. The radar signal of the radar device 36 is able to scan the region that spreads over a predetermined angle range which can be smaller than the predetermined angle range of the imaging device 34, towards the forward direction of the vehicle in the center of the optical axes of the radar device 36. This radar device 36 is able to create distance measurement data based on the time until the reflected waves are received after transmitting the electromagnetic waves to the forward direction of the vehicle and is able to sequentially output the created distance measurement data to the information input means 12 of the vehicle cruise control apparatus 10. The distance measurement data include information relating to the direction in which object is present, the distance from the host vehicle to the object and the related velocity of this object. Therefore, the radar device 36 has the function of an inter-vehicle distance sensor.

In addition, the information input means are able to receive information from an adaptive cruise control switch 42 for switching the adaptive cruise control. Additional host vehicle information and additional external information can be input into the information input means via the detector of the additional host vehicle information 44 and the detector of additional external information 46. These additional external information can relate to road topography, road speed limit and traffic information in relation to the route on which the host vehicle travels or to information obtained from vehicle-to-vehicle information.

The information received via the information input means is used in the driving cost optimization means 16 which is configured to use Adaptive Cruise Control based on Model Predictive Control in space domain for generating output information which is transferred via the information output means 14 of the vehicle cruise control apparatus 10 and then output to a traction force ECU 52. This output information contains a control target value for the traction force of the host vehicle. As an example, the traction force ECU 52 comprises in engine ECU 54 and a brake ECU 56.

In the example shown in FIG. 1, the engine ECU 54 and the brake ECU 56 obtain information from the information output means 14 separately. However, the present disclosure is not restricted to this example and can for instance also be applied to an electric vehicle control ECU.

The driving cost optimization means 16 has the target to reduce the energy loss of the host vehicle, to keep a safe distance to its detected preceding vehicle and to keep the tracking of the preceding vehicle. Most specifically, the driving cost optimization means should be able to predict future behavior of the preceding vehicle, should appropriately use external information like environmental information which include road topography, speed limit traffic and so on, and should be designed in such a manner that a fast numeric optimization solver is obtained.

The driving cost optimization means has conflicting objects. On the one hand, the fuel consumption should be minimized, while on the other hand the same average speed should be kept with the preceding vehicle. The object to keep the distance between the two vehicles not too far is in conflict with the objection of minimization of fuel consumption, while the object to guarantee a minimum safe distance is in conflict with keeping the same average speed of the host vehicle with the preceding vehicle.

With the present disclosure there has been found a suitable problem formulation for describing the objects, cost and environment with mathematical functions.

With this suitable problem formulation, it has to be borne in mind that Adaptive Cruise Control based on Model Predictive Control can be formulated in time domain and in space domain. One aspect of the present disclosure is the focus on space domain. More specifically, it may be preferable to design a suitable soft constraint and to define a maximum speed reference in a suitable manner.

If model predictive control is used in time domain, the traction force as a control variable changes with the time. On the one hand, the position of the host vehicle for the future is unknown before the future traction force is calculated. On the other hand, in order to calculate the optimal future traction force it is necessary to know the road gradient resistance in advance. This road gradient resistance depends on the vehicle position. Therefore, for MPC in time domain the future position of the host vehicle is estimated based on the current speed so that there is an inaccuracy. A non-optimal solution could be a result.

In Model Predictive Control in the space domain, the position of the vehicle is the control variable. The advantage is that the road gradient resistance is known in advance since the road gradient resistance depends on the position of the vehicle. The disadvantage of MPC in the space domain is that the calculation of the distance interval between the proceeding vehicle and the host vehicle is a non-linear problem. As a result, the optimization problem is also non-linear and can, therefore not be calculated online. For avoiding the non-linear problem, the vehicle distance can be indirectly controlled by using analytical speed references. However, with this speed references according to the prior art the distance between the host vehicle and the proceeding vehicle can still become too narrow so that the controller performance deteriorates. This disadvantage in the space domain has been overcome with the present disclosure.

With the driving cost optimization means 16 of the present disclosure Adaptive Cruise Control based on Model Predictive control in space domain is used, so that the driving costs of the host vehicle are optimized by varying the inter-vehicle distance. During this optimization a traction force F is adjusted in a horizon N so that the total cost is minimum. The total cost includes several parts as shown in the equation below. More specifically, in the driving cost optimization means 16 a maximum speed reference for the host vehicle is used which is defined as a ratio of the distance interval between the preceding vehicle and the host vehicle reduced by the minimum distance constrained and a reaction time of the driver. The cost optimization of the driving cost optimization means 16 according to the present disclosure is explained in the following in more detail.

The cost optimization is effected according to the following equation $$F = \underset{F}{\operatorname{argmin}} \left( \sum_{i=k}^{k+N} J_{fuel,i}(F, v) + Q_2 * \delta_2^2 + Q_3 * \sum_{i=k}^{k+N} (\delta_{3,i})^2 \right)$$

wherein $$F = \begin{bmatrix} F_{drive} \\ F_{brake} \end{bmatrix}$$

$$J_{fuel,i}(F, v) = P_{00} + P_{10} * v^2 + P_{01} F + P_{11} * F * v^2 + P_{20} * v^4 + P_{02} * F^2$$

In these equations, $J_{fuel,i}(F,v)$ represents the energy consumption as a quadratic function of the traction force F and the vehicle speed v. The traction force F includes the driving force $F_{drive}$ and the braking force $F_{brake}$.

The parameters $P_{00}$, $P_{01}$, $P_{10}$, $P_{02}$, $P_{20}$, $P_{11}$ are gear dependent and are optimized by solving one optimization problem in order to give the most accurate approximation for the engine power map.

Examples for these parameters are given below:

| gear ratio | 1.6 | 2.7 | 6.7 |
|---|---|---|---|
| p00 | 205.6799 | 257.2259 | 1.0370e³ |
| p01 | 2.9081 | 2.9026 | 2.8189 |
| p10 | 0.3362 | −0.2427 | −6.0279 |

| gear ratio | 1.6 | 2.7 | 6.7 |
|---|---|---|---|
| p02 | $6.9053e^{-4}$ | $2.9679e^{-4}$ | $1.0591e^{-4}$ |
| p20 | $1.4564e^{-4}$ | $1.1608e^{-5}$ | 0.0058 |
| p11 | $3.1712e^{-4}$ | $-3.9780e^{-5}$ | 0.0014 |

A first penalty $\delta_3$ penalizes too close inter-vehicle distance while a second penalty $\delta_2$ penalizes too slow speed of the host vehicle. $Q_2$ and $Q_3$ are the corresponding weighting factors for these penalties.

The system equation is defined as follows:

$$v_{k+1}^2 = A \cdot v_k^2 + B \cdot F - C \cdot \text{road gradient force}(\alpha(k))$$

wherein $v_k$ is the speed of the host vehicle at the position k while $v_{k+1}$ is the speed of the host vehicle at the subsequent position k+1. In this system equation A, B C are constant values which depend on the host vehicle weight and on host vehicle dynamic coefficients.

The maximum speed reference $V_{ref}$ for the host vehicle according to the present disclosure is defined as $$V_{ref} = \frac{d_{k+1} - d_{min}}{h_r}$$

wherein $d_{k+1}$ is the inter-vehicle distance between the preceding vehicle and the host vehicle at the subsequent position, $d_{min}$ is the minimum safe distance and $h_r$ is the reaction time which can, for instance, be preset or set by the driver. One example for the reaction time is 4 s.

In this equation, the minimum safe distance $d_{min}$ in dependence on the minimum distance $d_{standstill}$ between the preceding vehicle and the host vehicle when the host car is at standstill, on a time value $h_{min}$ which is based on traffic regulation, and for instance can be 2 seconds, and on the speed $v_{h,k}$ of the host vehicle:

$$d_{min} = d_{standstill} + h_{min} v_{h,k}$$

In addition, a preferred inter-vehicle comfort distance $d_{comf}$ preferred by the driver is defined in dependence on the minimum safe distance $d_{min}$, a reaction time value $h_r$ which is used to define the driver preferred comfort distance and on the speed $v_{h,k}$ of the host vehicle.

$$d_{comf} = d_{dim} + h_r v_{h,k} = d_{standstill} + (h_{min} + h_r) v_{h,k}$$

Figure 2:
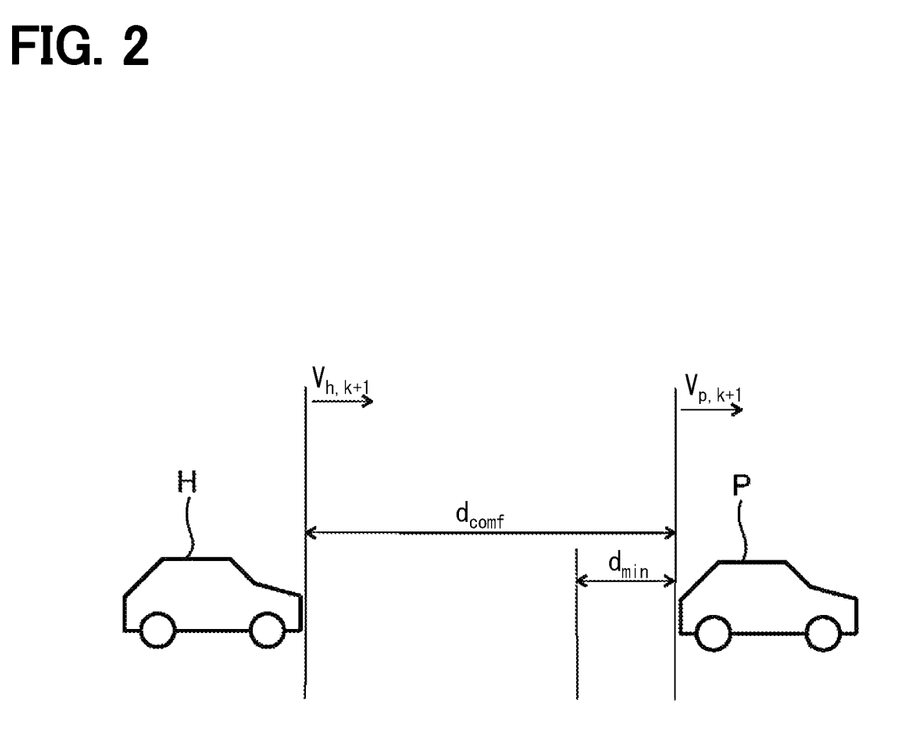
FIG. 2 is a graphical representation of the distances and speeds of the host vehicle and the preceding vehicle.

The interrelationship of the distances $d_{min}$ and $d_{comf}$ is shown in FIG. 2.

The preferred inter-vehicle comfort distance $d_{comf}$ is used in above equation for the maximum speed reference $V_{ref}$ as follows:

When the inter-vehicle distance $d_{k+1}$ approaches the minimum distance constraint $d_{min}$ the speed reference $V_{ref}$ approaches zero. As a result, since the speed of the host vehicle is restricted based on the speed reference $V_{ref}$ subsequently, the inter-vehicle distance $d_{k+1}$ increases. The reaction time $h_r$ which is reflected in the above equation for the preferred inter-vehicle comfort distance $d_{comf}$ is used to reserve a flexibility room for the control.

Reserving flexibility room for the control has the following purpose: When the host vehicle comes very close to the hard constraint $d_{min}$ and the preceding vehicle strongly decelerates, there is no choice for the host vehicle other than to decelerate. In the case of flexibility room for the control, the host vehicle is able to coast when the preceding vehicle decelerates.

The maximum speed reference for the host vehicle is defined for the above cost optimization equation with the above mentioned first penalty $\delta_3$ as a soft constraint as follows:

$$v_{h,k+1} \leq \frac{d_{k+1} - d_{min}}{h_r} + \delta_3, \text{ wherein } \delta_3 \geq 0$$

A second soft constraint which penalizes too slow speed of the host vehicle is defined as follows:

$$\Sigma_{i=k}^{k+N} v_{h,i} \geq \Sigma_{i=k}^{k+N} v_{p,i} - \delta_2, \text{ wherein } \delta_2 \geq 0$$

In other words, the penalty depends on the difference between the average speed difference between the preceding vehicle and the host vehicle. That means, the average speed of the host vehicle should not be too much lower than that of the preceding vehicle. As a result, it is possible to plan freely the speed trajectory within one horizon N, while, at the same time, the average speed of the host vehicle is similar to that of the preceding vehicle.

Additional constraints for the cost optimization include:

$$v_{min} < v < v_{max}$$

$$0 < F_{drive} < F_{drive,max}(v)$$

$$F_{brake,min} < F_{brake} < 0$$

These constraints define the speed of the host vehicle between a minimum and maximum value, restrict the drive force to a value between zero and a maximum drive value which depends on the speed of the host vehicle and restrict the braking force to a value between a minimum braking force and zero.

Figure 3A:
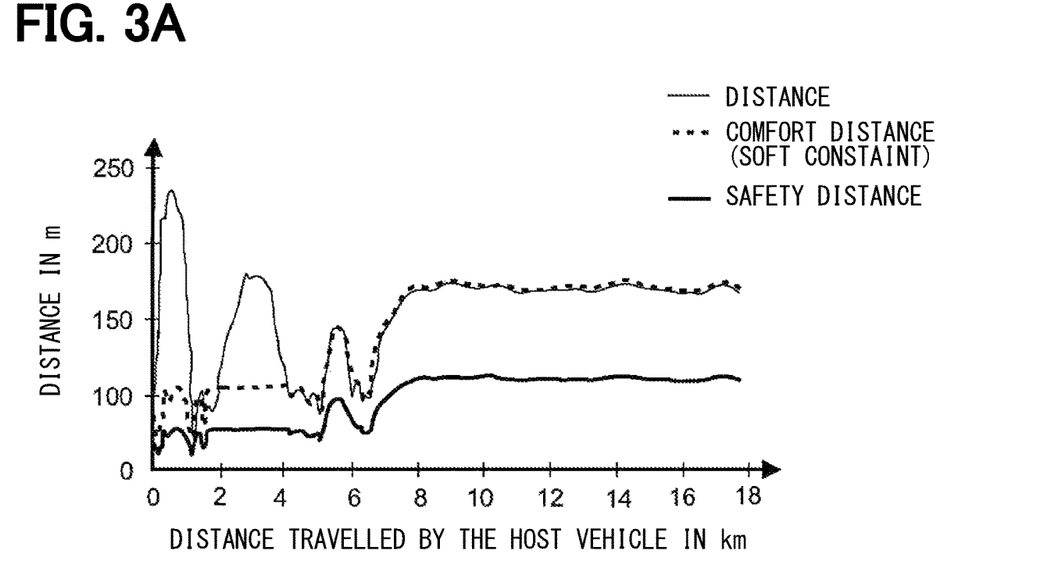
FIG. 3A shows the inter-vehicle distance over the distance travelled by the host vehicle.
Figure 3B:
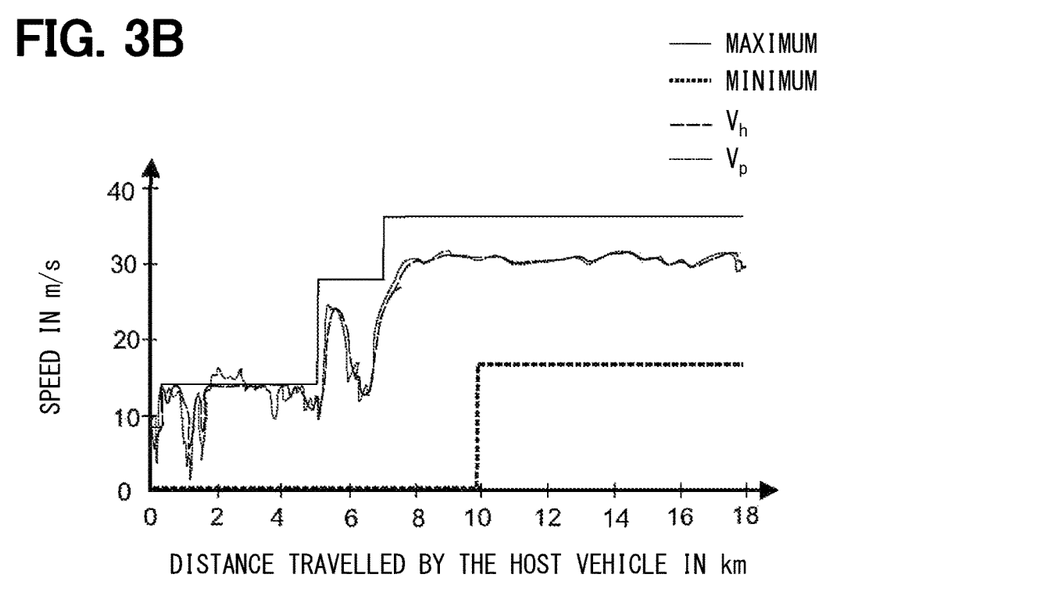
FIG. 3B shows the speeds of the preceding vehicle and the host vehicle over the travelled distance.
Figure 3C:
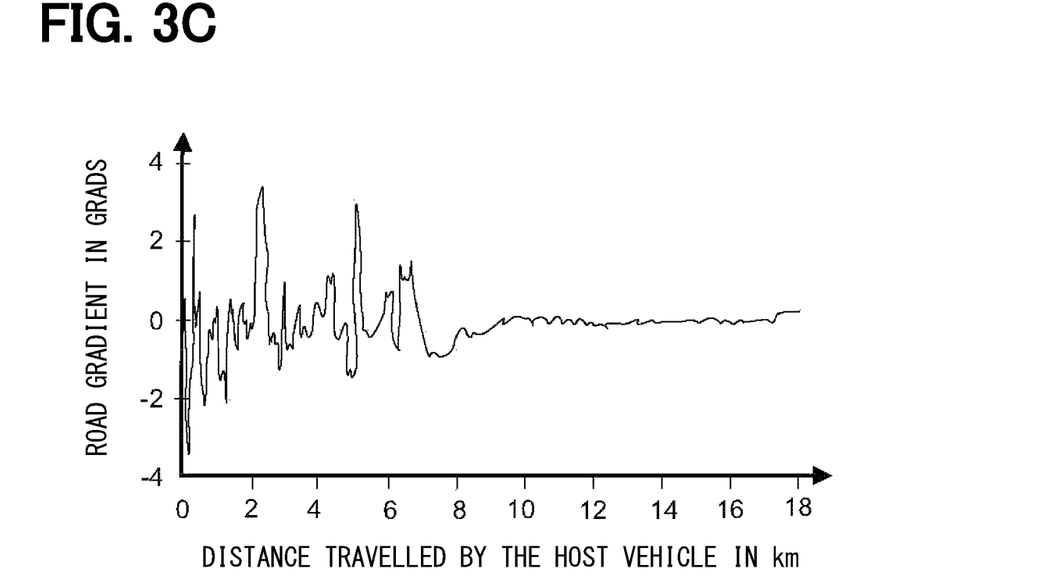
FIG. 3C show the road gradient over the travelled distance.
Figure 3D:
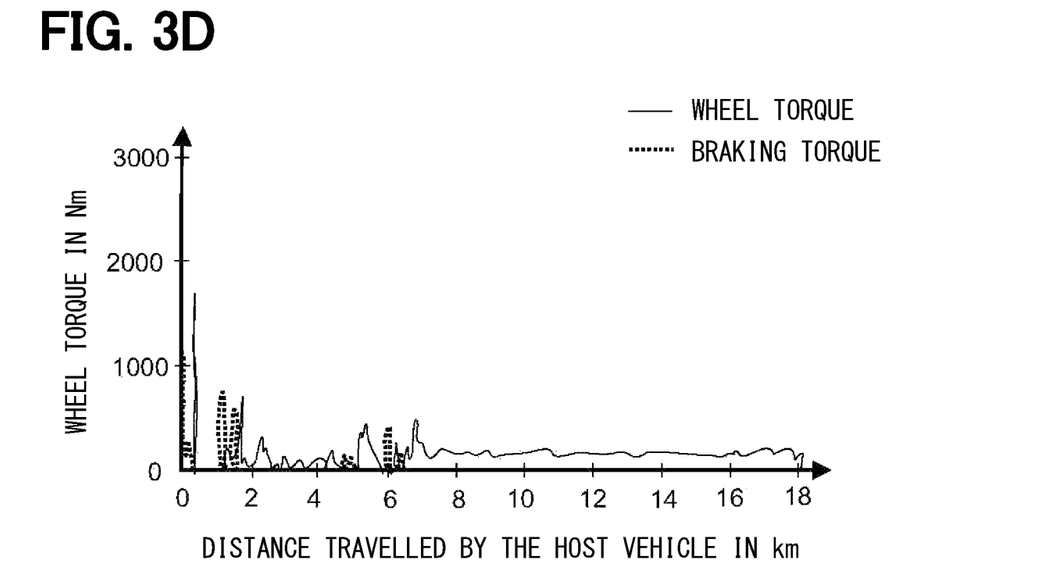
FIG. 3D shows the wheel torque and the braking torque over the travelled distance wherein simulation results with respect to the use of the present disclosure are shown.

A simulation of the cost optimization of the present disclosure is shown in FIG. 3A through 3D wherein FIG. 3A shows the inter-vehicle distance over the distance travelled by the host vehicle, FIG. 3B shows the speeds of the preceding vehicle and the host vehicle over the travelled distance, FIG. 3C show the road gradient over the travelled distance and FIG. 3D shows the wheel torque and the braking torque over the travelled distance. In this simulation, the following weighting factors have been used:

$$Q2 = Q3 = 1e^0$$

As can be gathered from FIG. 3B, as a result of the optimization according to the present disclosure, the speed $v_h$ of the host vehicle is close to the speed $v_p$ of the preceding vehicle.

Moreover, as can be gathered from FIG. 3A, the distance $d_k$ between the preceding vehicle and the host vehicle comes, on the one hand, close to the comfort distance $d_{comf}$ (safe constraint) and keeps, on the other hand, sufficient flexibility room for control with respect to the safety distance $d_{min}$. Being close to the comfort distance $d_{comf}$ means that the inter-vehicle distance $d_k$ is not too large. The comfort distance $d_{comf}$ is a soft constraint. As a result, there is flexible room for the distance $d_k$ to do optimization.

Despite a changing road gradient according to FIG. 3C during the simulation, a minimum of wheel torque and braking torque is necessary according to FIG. 3D.

As a result of the simulation, a fuel consumption reduction of 6.95% could be obtained by the driving cost optimization executed in the driving cost optimization means 16 of the present disclosure.

Figure 4:
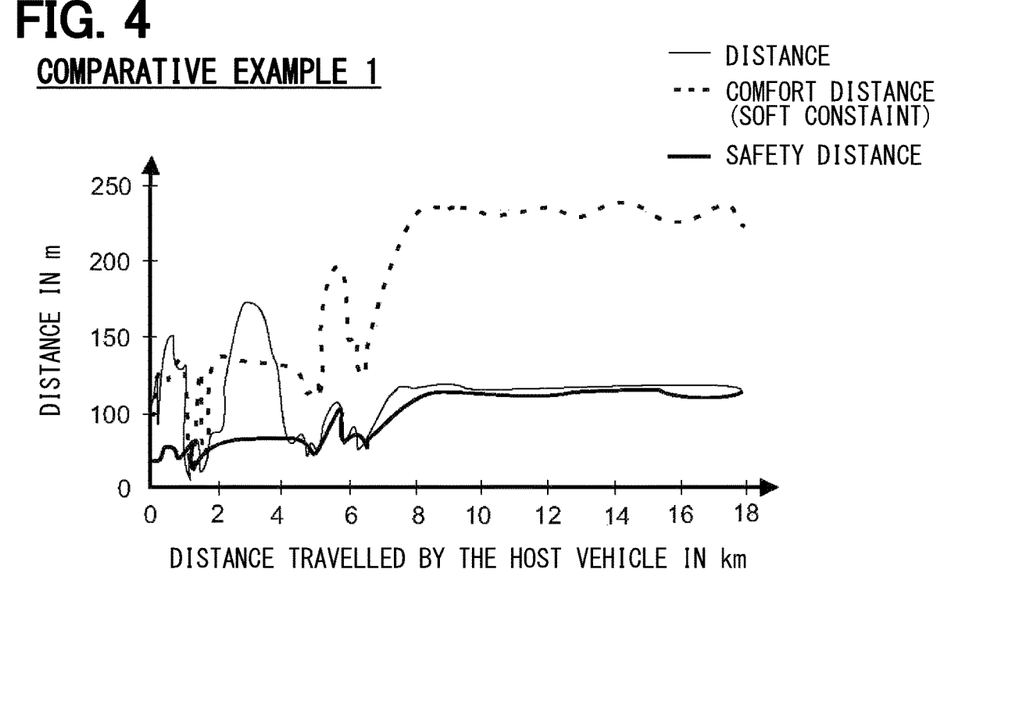
FIG. 4 shows comparative example 1.
Figure 5:
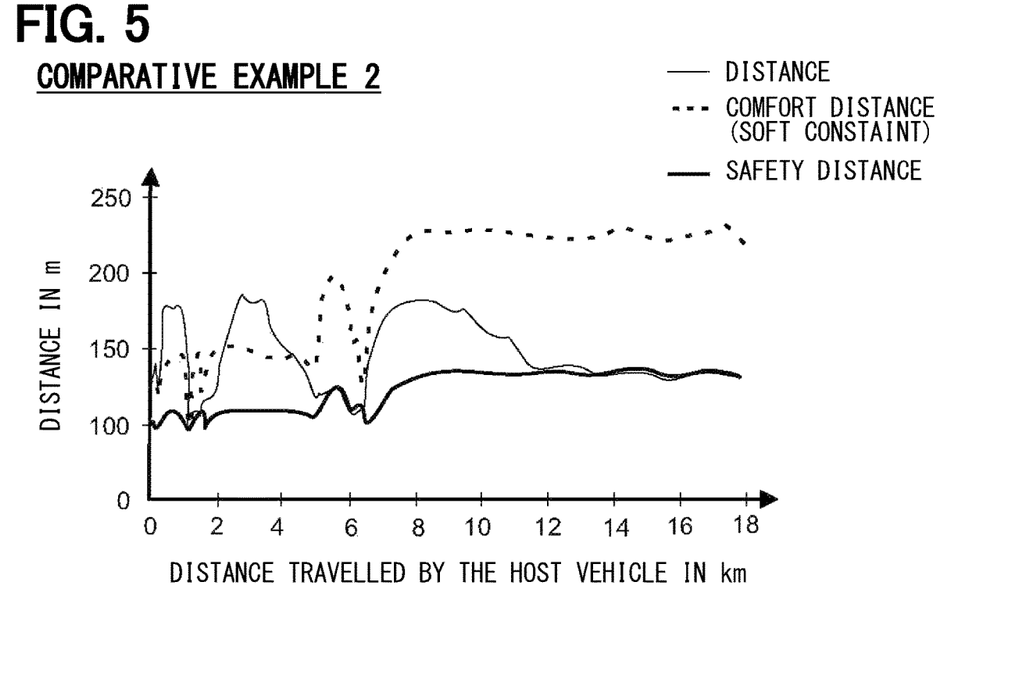
FIG. 5 shows comparative example 2 of the inter-vehicle distance over the distance travelled by the host vehicle while using a maximum speed reference for the host vehicle defined differently from that of the present disclosure.

In order to better illustrate the benefit of the present disclosure, FIG. 4 and FIG. 5 show comparative example 1 and comparative example 2 in which instead of the second soft constraint $$v_{h,k+1} \leq \frac{d_{k+1} - d_{min}}{h_r} + \delta_3$$

of the present disclosure the maximum allowable speed $v_{max,k+1}$ of the host vehicle at the position k+1 as a hard constraint has been calculated based on the following function $$f(v_{k+1}) = h_{min}v_{k+1} - \frac{2\Delta s v_{p,k}}{v_k + v_{k+1}} + d_{min} - d_k + \Delta s \leq 0$$

which includes $v_{p,k}$. The circumstance that $v_{p,k}$ cannot be directly detected already defines a difference of these comparative examples 1 and 2 with respect to the present disclosure.

In comparative example 1 of FIG. 4, the same weighting factors as in FIGS. 3A, 3B, 3C and 3D of the present disclosure have been used:

$$Q2=Q3=1e^0$$

Moreover, in comparative example 1 of FIG. 4, the maximum speed reference as been determined in an analytical way.

As can be seen in FIG. 4, the host vehicle encounters more resistance when it approaches the preceding vehicle. However, after a certain time, the distance shown in FIG. 4 is very close to the safety distance and far from the comfort distance (soft distance) so that there is no flexibility room for control. The fuel consumption reduction which could be obtained with comparative example 1 of FIG. 4 was 5% and consequently lower than that of the present disclosure.

In the comparative example 2 of FIG. 5, the weighting factors Q3 for the maximum speed has been changed to $1e^4$ while the other weighting factor has been maintained with $Q2=1e^0$ The result is a behavior of the inter-vehicle distance like a damper which makes the approaching process slower but does not put the host vehicle away from the preceding vehicle when the speed of the host vehicle approaches that of the preceding vehicle. The fuel consumption reduction in comparative example 2 of FIG. 5 was 2.07% and consequently much lower than that of the present disclosure.

From comparative example 1 in FIG. 4 it can be gathered that the host vehicle approaches too much to the preceding vehicle. Then, the weighting factor for maximum speed reference has been increased on purpose. From comparative example 2 in FIG. 5 it can be gathered that even with a high weighting factor Q3, the host vehicle still gradually comes close to the preceding vehicle, although at a distance travelled of 6 km, the host car tends to get a bit far away from preceding vehicle.

The comparative examples 1 and 2 of FIGS. 4 and 5 explains that the old design itself, despite a certain fuel benefit, is disadvantageous, because no matter which weighting factor are used, the host vehicle comes too close to the preceding vehicle and the performance of the host vehicle is worse than expected.

In contrast thereto, in the present disclosure, even if the same weighting factors as in comparative example 1 are used, the control apparatus with the Adaptive Cruise Control based on MPC in space domain of the present disclosure works beneficial.

According to a first aspect of the present disclosure a vehicle Adapted Cruise Control apparatus for controlling the traveling of a host vehicle on the basis of a movement of a proceeding vehicle travelling in front of the host vehicle is provided, wherein this apparatus comprises host vehicle speed input means for receiving the vehicle speed of the host vehicle, inter-vehicle distance input means for receiving an inter-vehicle distance between the preceding vehicles and the host vehicle; safe distance defining means for defining a minimum safe inter-vehicle distance; reaction time setting means for setting a reaction time of the driver with respect to an inter-vehicle comfort distance preferred by the driver; driving cost optimization means which is configured to use adaptive cruise control based on model predictive control in space domain so that the driving costs of the host vehicle are optimized by varying vehicle speed and/or traction force of the host vehicle, wherein the driving cost optimization means uses a maximum speed reference for the host vehicle which is defined as ratio between a) the inter-vehicle distance detected by the inter-vehicle distance sensor reduced by the minimum safe inter-vehicle distance defined by the safe distance defining means and b) the reaction time of the driver set by the reaction time setting means. The maximum speed reference of the present disclosure changes with the current inter vehicle distance between the host vehicle and the proceeding vehicle. Therefore, the maximum speed reference has a clearer physical meaning. If the inter-vehicle distance between the proceeding vehicle and the host vehicle reduces, the rebound force which the host vehicle receives increases so that the inter-vehicle distance becomes larger. Since the inter-vehicle distance is in the present disclosure in a more reasonable range, the real driving emission is lowered.

In addition, the driving cost optimization means may be configured to use the difference between the host vehicle speed and the maximum speed reference as a first penalty for too close inter-vehicle distance in driving cost optimization if the host vehicle speed is not less than the maximum speed reference. When now the inter-vehicle distance approaches to the minimum safe inter-vehicle distance the maximum speed reference decreases so that the first penalty becomes bigger. As a result of such a control the inter-vehicle distance then increases.

In addition, the Adaptive Cruise Control apparatus may further include preceding vehicle speed input means for receiving the vehicle speed of the preceding vehicle, wherein the driving cost optimization means is configured to use the difference between the average vehicle speeds of the host vehicle and the preceding vehicle as a second penalty for too slow host vehicle speed. The requirement of keeping the distance between the two vehicles not too far, which conflicts with the requirement of the minimized few consumption, is satisfied in an improved manner.

In addition, the adaptive cruise control apparatus may further include a traction force output means for outputting the traction force of the host vehicle, wherein the driving cost optimization means is configured to optimize the driving costs based on energy consumption which includes a quadratic function of the traction force of the host vehicle and the vehicle speed of the host vehicle. With this consideration of the energy consumption, the total driving costs are more appropriately approximated while the programming efforts in order to implement the optimization are reduced.

In addition, the driving cost optimization means may be configured to use a maximum host vehicle speed, a maximum host vehicle traction force and the minimum safe inter-vehicle distance defined by the safe distance defining means as hard constraints in cost optimization. With these hard constraints a clear and improved vehicle behavior of the host vehicle is obtained while avoiding unexpected behavior of the host vehicle in real traffic situation for surrounding vehicles.

In addition, the safe distance defining means may be configured to define the minimum safe inter-vehicle distance based on the product of the host vehicle speed received by the host vehicle speed input means and of a stored value for a minimum time. As a result the real driving situation of the host vehicle is considered with a selected minimum safe inter-vehicle distance.

In addition, the safe distance defining means may be configured to define the minimum safe inter-vehicle distance based on a minimum distance between the preceding vehicles and the host vehicle when the host vehicle is at standstill. With such a minimum distance the safety of the operation of the vehicle to which such a control apparatus is applicable can be increased.

In addition, the reaction time setting means may be configured to set the reaction time of the driver based on a stored value for the reaction time or the reaction time setting means is configured to set the reaction time of the driver based on an input received by a reaction time input means and wherein the reaction time is able to be used together with the host vehicle speed and the minimum safe inter-vehicle distance for defining the driver preferred inter-vehicle comfort distance. It is preferable that the minimum safe inter-vehicle distance linearly increases with the host vehicle speed. As a result, the reaction time can be individually set by the driver so that the driver can adjust according to his preferred inter-vehicle distance.

In addition, the driving cost optimization means may be configured to be able to optimize the driving costs of the host vehicle by solving the optimization problem at each step in space domain until the end of driving of the host vehicle. As a result, an optimized vehicle behavior in view of reduced fuel consumption can be obtained.

The present disclosure is applicable for instance to electric vehicle and to internal combustion engine vehicle.

According to another aspect of the present disclosure, a method for executing a vehicle adaptive cruise control for controlling the traveling of a host vehicle on the basis of the movement of a preceding vehicle traveling in front of the host vehicle is provided which comprises the steps of receiving the vehicle speed of the host vehicle, receiving an inter-vehicle distance between the preceding vehicles and the host vehicle, defining a minimum safe inter-vehicle distance, setting a reaction time of the driver with respect to an inter-vehicle comfort distance preferred by the driver, optimizing the driving costs using adaptive cruise control based on model predictive control in space domain so that the driving costs of the host vehicle are optimized by varying the inter-vehicle distance, wherein the during optimizing the driving costs a maximum speed reference for the host vehicle is used, which is defined as ratio between a) the inter-vehicle distance reduced by the minimum safe inter-vehicle distance and b) the reaction time of the driver. With this method the real driving emission is lowered as already specified in relation to the first aspect.

In addition, steps which are executable in the above mentioned apparatuses can be used while obtaining the above mentioned benefits, respectively.

In this application, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The foregoing components are conceptual and not limited to those described in the foregoing embodiment. For example, functions realized by one of the components can be divided into multiple components, or, among such components, functions provided by two or more components can be combined together in one function.

While the present disclosure has been described in connection with what is presently considered to be a practical exemplary embodiment, it is to be understood that the disclosure is not limited to the disclosed embodiment, examples and configurations.

What is claimed is:

1. A vehicle adaptive cruise control apparatus for controlling traveling of a host vehicle based on a movement of a preceding vehicle traveling in front of the host vehicle, the vehicle adaptive cruise control apparatus comprising:
   a processor configured to:
      receive a vehicle speed of the host vehicle;
      receive an inter-vehicle distance between the preceding vehicle and the host vehicle;
      define a minimum safe inter-vehicle distance;
      set a reaction time of a driver with respect to an inter-vehicle comfort distance preferred by the driver, which is different than the minimum safe inter-vehicle distance;
      execute a driving cost optimization, as a model predictive control in a space domain, based on (i) energy consumption of the host vehicle corresponding to a change of the vehicle speed or the traction force of the host vehicle, (ii) a first penalty that increases as the inter-vehicle distance approaches to the minimum safe inter-vehicle distance, and (iii) a second penalty that increases with a decrease of a difference between an average speed of the host vehicle and an average speed of the preceding vehicle;
      execute adaptive cruise control based on the model predictive control in the space domain so that driving costs of the host vehicle are optimized in the executed driving cost optimization by varying the vehicle speed or the traction force of the host vehicle, and the adaptive cruise control sets a maximum speed reference for the host vehicle based on the inter-vehicle distance detected by an inter-vehicle distance sensor, such that the maximum speed reference is defined as ratio between:
         a) the detected inter-vehicle distance reduced by the set minimum safe inter-vehicle distance, and
         b) the set reaction time of the driver; and
      determine and apply, in the executed adaptive cruise control, the traction force of the host vehicle so that a driving cost calculated by the driving cost optimization is at a minimum value.

2. The vehicle adaptive cruise control apparatus according to claim 1, wherein the processor is configured to use a difference between the vehicle speed of the host vehicle and the maximum speed reference as the first penalty when the inter-vehicle distance is a too close inter-vehicle distance in the driving cost optimization when the host vehicle speed is not less than the maximum speed reference.

3. The vehicle adaptive cruise control apparatus according to claim 1, wherein the processor is configured to:
receive a vehicle speed of the preceding vehicle, and
use a difference between the average vehicle speeds of the host vehicle and the preceding vehicle as the second penalty as a too slow host vehicle speed.

4. The vehicle adaptive cruise control apparatus according to claim 1, wherein the processor is configured to:
output the traction force of the host vehicle, and
optimize the driving costs based on energy consumption that includes a quadratic function of the traction force of the host vehicle and the vehicle speed of the host vehicle.

5. The vehicle adaptive cruise control apparatus according to claim 1, wherein the processor is configured to use a maximum host vehicle speed, a maximum host vehicle traction force, and the minimum safe inter-vehicle distance as constraints in the driving cost optimization.

6. The vehicle adaptive cruise control apparatus according to claim 1, wherein the processor is configured to define the minimum safe inter-vehicle distance based on a product of (i) the vehicle speed of the host vehicle and (ii) a stored value for a minimum time.

7. The vehicle adaptive cruise control apparatus according to claim 1, wherein the processor is configured to define the minimum safe inter-vehicle distance based on a minimum distance between the preceding vehicle and the host vehicle when the host vehicle is at standstill.

8. The vehicle adaptive cruise control apparatus according to claim 1, wherein the processor is configured to:
set the reaction time of the driver based on a stored value for the reaction time or to set the reaction time of the driver based on an input received by a reaction time input module, and
use the reaction time together with the host vehicle speed and the minimum safe inter-vehicle distance to define the inter-vehicle comfort distance.

9. The vehicle adaptive cruise control apparatus according to claim 1, wherein the processor is configured to optimize the driving costs of the host vehicle by solving an optimization problem at each step in space domain until an end of driving of the host vehicle.

10. A method for executing a vehicle adaptive cruise control for controlling traveling of a host vehicle based on a movement of a preceding vehicle traveling in front of the host vehicle, the method comprising:
receiving a vehicle speed of the host vehicle;
receiving an inter-vehicle distance between the preceding vehicle and the host vehicle;
defining a minimum safe inter-vehicle distance;
setting a reaction time of a driver with respect to an inter-vehicle comfort distance preferred by the driver, which is different than the minimum safe inter-vehicle distance;
optimizing driving costs, as a model predictive control in a space domain, based on (i) energy consumption of the host vehicle corresponding to a change of the vehicle speed or the traction force of the host vehicle, (ii) a first penalty that increases as the inter-vehicle distance approaches to the minimum safe inter-vehicle distance, and (iii) a second penalty that increases with a decrease of a difference between an average speed of the host vehicle and an average speed of the preceding vehicle;
executing adaptive cruise control based on the model predictive control in the space domain so that the driving costs of the host vehicle are optimized in the executed driving cost optimization by varying the inter-vehicle distance, and during optimizing the driving costs, the adaptive cruise control sets a maximum speed reference for the host vehicle based on the inter-vehicle distance detected by an inter-vehicle distance sensor, such that the maximum speed reference is defined as a ratio between:
a) the detected inter-vehicle distance reduced by the set minimum safe inter-vehicle distance, and
b) the set reaction time of the driver; and
determining and applying, in the executed adaptive cruise control, the traction force of the host vehicle so that a driving cost calculated by the driving cost optimization is at a minimum value.

11. A vehicle adaptive cruise control apparatus comprising:
a processor that is coupled to at least one sensor, the processor being configured to:
receive a vehicle speed of a host vehicle from the sensor;
receive an inter-vehicle distance between a preceding vehicle, which is traveling in front of the host vehicle, and the host vehicle;
define a minimum safe inter-vehicle distance;
set a reaction time of a driver with respect to an inter-vehicle comfort distance, which is different than the minimum safe inter-vehicle distance;
execute a driving cost optimization, as a model predictive control in a space domain, based on (i) energy consumption of the host vehicle corresponding to a change of the vehicle speed or the traction force of the host vehicle, (ii) a first penalty that increases as the inter-vehicle distance approaches to the minimum safe inter-vehicle distance, and (iii) a second penalty that increases with a decrease of a difference between an average speed of the host vehicle and an average speed of the preceding vehicle;
execute adaptive cruise control based on the model predictive control in the space domain so that driving costs of the host vehicle are optimized in the executed driving cost optimization by varying the vehicle speed or the traction force of the host vehicle, and the processor sets a maximum speed reference for the host vehicle based on the inter-vehicle distance detected by the sensor, such that the maximum speed reference is defined as ratio between:
a) the detected inter-vehicle distance reduced by the set minimum safe inter-vehicle distance, and
b) the set reaction time of the driver; and
determine and apply, in the executed adaptive cruise control, the traction force of the host vehicle so that a driving cost calculated by the driving cost optimization is at a minimum value,
wherein the vehicle adaptive cruise control apparatus controls traveling of the host vehicle based on a movement of the preceding vehicle.

\* \* \* \* \*